United States Patent
Uetani et al.

(10) Patent No.: US 10,848,756 B2
(45) Date of Patent: Nov. 24, 2020

(54) IMAGE PROCESSING APPARATUS AND FAILURE DETECTION METHOD FOR IMAGE PROCESSING APPARATUS

(71) Applicants: Kabushiki Kaisha Toshiba, Minato-ku (JP); Toshiba Electronic Devices & Storage Corporation, Minato-ku (JP)

(72) Inventors: Yoshiharu Uetani, Kawasaki (JP); Masami Ashino, Ota (JP)

(73) Assignees: Kabushiki Kaisha Toshiba, Minato-ku (JP); Toshiba Electronic Devices & Storage Corporation, Minato-ku (JP)

( * ) Notice: Subject to any disclaimer, the term of this patent is extended or adjusted under 35 U.S.C. 154(b) by 0 days.

(21) Appl. No.: 16/565,659

(22) Filed: Sep. 10, 2019

(65) Prior Publication Data

US 2020/0288116 A1    Sep. 10, 2020

(30) Foreign Application Priority Data

Mar. 8, 2019  (JP) .................................. 2019-042299

(51) Int. Cl.
```
B60W 50/02    (2012.01)
H04N 17/00    (2006.01)
G07C 5/08     (2006.01)
```
(52) U.S. Cl.
CPC ......... *H04N 17/002* (2013.01); *G07C 5/0808* (2013.01); *G07C 5/0866* (2013.01); *B60W 50/0205* (2013.01)

(58) Field of Classification Search
CPC .............................................. B60W 50/0205
See application file for complete search history.

(56) References Cited

U.S. PATENT DOCUMENTS

```
9,725,088  B2 *   8/2017  Yamakoshi .......... B60W 10/20
10,152,890 B2 *  12/2018  Mutou ..................... G08G 1/16
10,576,968 B2 *   3/2020  Yamakoshi .......... B60W 30/09
```
(Continued)

FOREIGN PATENT DOCUMENTS

```
JP    2016-117401 A    6/2016
JP    2017-017635 A    1/2017
```
(Continued)

*Primary Examiner* — Paulos M Natnael
(74) *Attorney, Agent, or Firm* — Oblon, McClelland, Maier & Neustadt, L.L.P.

(57) ABSTRACT

An image processing apparatus of an embodiment is an image processing apparatus including a first image processing section configured to perform image processing for frames which are designated as processing target frames, a failure diagnosis processing section configured to perform failure diagnosis of the first image processing section at each frame period, and a failure diagnosis control section configured to control execution of the failure diagnosis processing section. The failure diagnosis control section includes a signal selecting section that gives notice of a failure diagnosis permission state which is a state where the first image processing section is capable of executing failure diagnosis. The signal selecting section outputs a failure diagnosis start permission signal at a time point of receiving a pseudo image processing completion signal from a failure diagnosis processing start timing generating section if the input frame is a processing non-target frame.

8 Claims, 8 Drawing Sheets

(56) References Cited

U.S. PATENT DOCUMENTS

| | | | |
|---|---|---|---|
| 2016/0059853 A1* | 3/2016 | Yamakoshi | G05B 19/0423 |
| | | | 701/36 |
| 2017/0011271 A1* | 1/2017 | Hishinuma | G06F 3/00 |
| 2017/0297570 A1* | 10/2017 | Yamakoshi | B60W 30/09 |
| 2019/0082172 A1* | 3/2019 | Uetani | H04N 17/002 |

FOREIGN PATENT DOCUMENTS

| | | |
|---|---|---|
| JP | 6407176 B2 | 10/2018 |
| JP | 6458579 B2 | 1/2019 |
| JP | 2019-049884 A | 3/2019 |

\* cited by examiner

IMAGE PROCESSING APPARATUS AND FAILURE DETECTION METHOD FOR IMAGE PROCESSING APPARATUS

CROSS-REFERENCE TO RELATED APPLICATIONS

This application is based upon and claims the benefit of priority from the prior Japanese Patent Application No. 2019-42299 filed on Mar. 8, 2019; the entire contents of which are incorporated herein by reference.

FIELD

Embodiments described herein relate generally to an image processing apparatus, and a failure detection method for the image processing apparatus.

BACKGROUND

In recent years, a system (driving safety support system) has been put to practical use which supports driving by mounting a stereo camera on a movable body such as a vehicle, detecting obstacles based on images that are outputted at fixed intervals from the camera, and performing automatic control relating to travel of the vehicle so as to avoid contact with the obstacles.

In a system like this, from a viewpoint of functional safety, it is necessary to periodically perform failure diagnosis of an image processing section that outputs image data on which is signal processing, carried out to picturization pictures (frames). The failure diagnosis is performed in a period after image processing of an arbitrary frame is completed until image processing of the next frame is started, that is, in a free time of image processing by the image processing section.

Incidentally, in an image processing apparatus, a plurality of image processing sections may be configured by being connected in tandem. In the configuration like this, there is a case in which a preceding image processing section performs signal processing of target frames of processing, but does not perform signal processing of other frames and does not output the image data.

When the image processing section operates intermittently in this way, a signal indicating a timing of image processing completion is also outputted intermittently, and therefore it is difficult to perform the failure diagnosis regularly within a predetermined period.

DETAILED DESCRIPTION

An image processing apparatus of each of present embodiments includes a first image processing section configured to perform image processing for each frame which is picturized continuously, a failure diagnosis processing section configured to perform failure diagnosis of the first image processing section at each frame period, and a failure diagnosis control section configured to control execution of the failure diagnosis to the failure diagnosis processing section. The first image processing section performs image processing to the image data of frames which are designated as processing target frames. The failure diagnosis control section includes a failure diagnosis permission notification section configured to give notice of a failure diagnosis permission state indicating that the first image processing section is in a state of being able to execute the failure diagnosis. And the failure diagnosis permission notification section gives notice of the failure diagnosis permission state when the failure diagnosis permission notification section acquires notice that the image processing in the first image processing section is in an idle state, if the input frame is a processing non-target frame which is a frame other than the processing target frames.

Hereinafter, the embodiments will be described with reference to the drawings.

First Embodiment

An image processing apparatus according to the present embodiment is an apparatus including an image processing section configured to perform image processing for each frame which is picturized continuously, like an on-vehicle camera, and includes a function of performing failure diagnosis of an image processing section every time the image processing for one frame is completed. An object of performing failure diagnosis of the image processing section every time the image processing for one frame is completed is to perform driving support control with high safety by confirming reliability of image data after image processing and performing image recognition by using image data of which image processing is normally performed.

Figure 1:
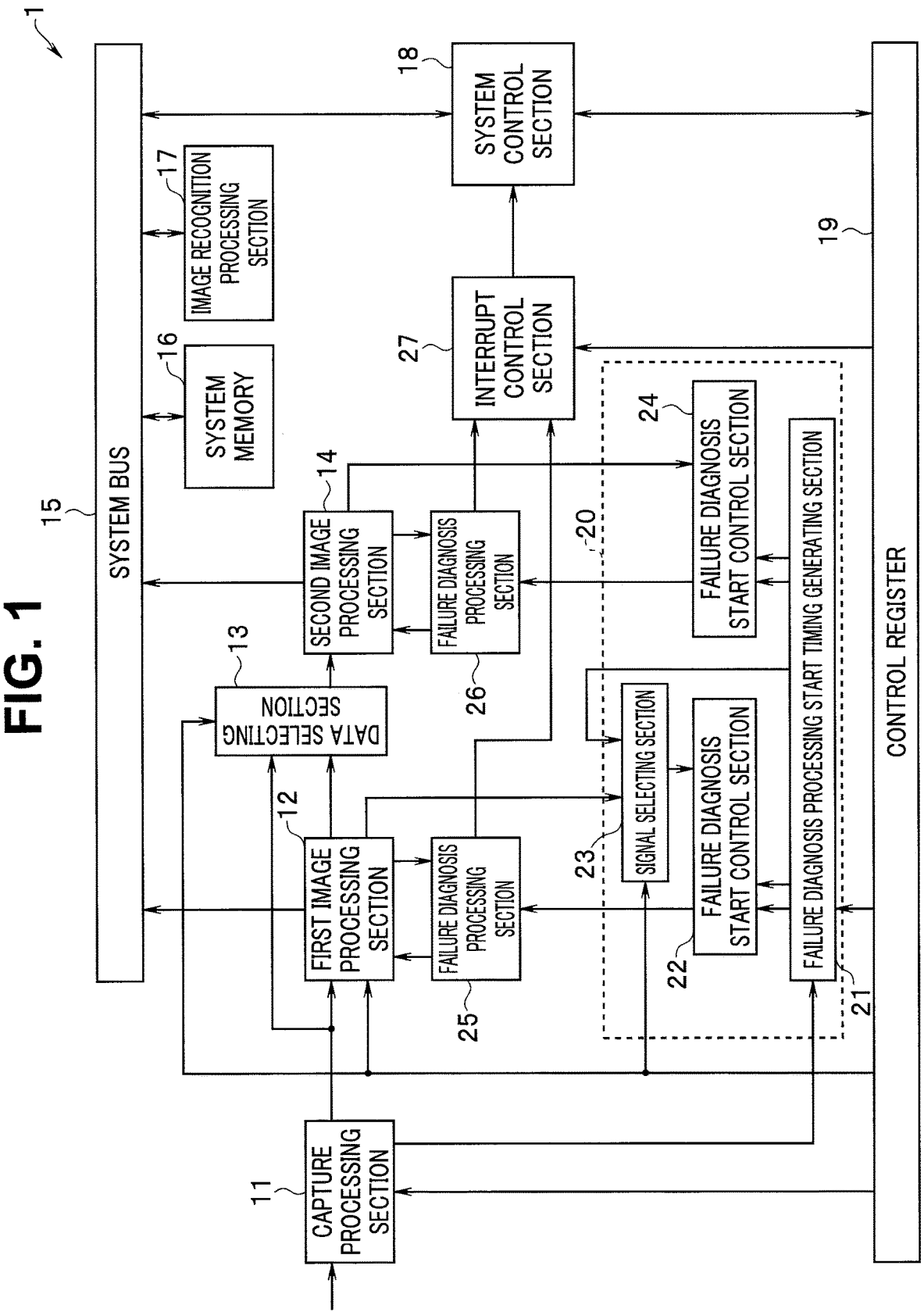
FIG. 1 is a block diagram illustrating an example of a configuration of an image processing apparatus 1 according to a first embodiment.

FIG. 1 is a block diagram illustrating an example of a configuration of an image processing apparatus 1 according to a first embodiment. The image processing apparatus 1 includes a capture processing section 11, a first image processing section 12, a data selecting section 13, a second image processing section 14, a system memory 16, an image recognition processing section 17, and a system control section 18. Further, the image processing apparatus 1 also includes a failure diagnosis control section 20, failure diagnosis processing sections 25 and 26, and an interrupt control section 27.

The first image processing section 12, the second image processing section 14, the system memory 16, the image recognition processing section 17, and the system control section 18 are connected via a system bus 15. Further, the system control section 18 is connected to a control register 19, and instructs a processing content to the capture processing section 11, the first image processing section 12, the interrupt control section 27, and the failure diagnosis control section 20 via the control register 19.

The capture processing section 11 receives a video signal from a video camera, which is not illustrated, and outputs image data, which is synchronized with a system clock, to the first image processing section 12 and the data selecting section 13. Further, when the capture processing section 11 outputs the image data, the capture processing section 11 outputs a frame input start signal indicating a timing at which image data at beginning of respective frames are inputted to the first image processing section 12 and the data selecting section 13, to the failure diagnosis control section 20.

The first image processing section 12 includes a DSP (digital signal processing unit) or the like, and performs predetermined image processing to image data of a processing target frame that is designated by the control register 19. The first image processing section 12 performs, for example, extraction processing of brightness distribution information, demosaic processing which generates RGB data from RAW data, brightness correction processing in which the brightness of image data is adjusted to a suitable level for image recognition, and the like. The image data after image processing which is outputted from the first image processing section 12 is inputted to the second image processing section 14 via the data selecting section 13. Further, when the first image processing section 12 extracts statistics information or the like concerning image data of the processing target frame by extraction processing of brightness value distribution information or the like, the information is outputted to the system memory 16 via the system bus 15. Further, the first image processing section 12 outputs a signal (image processing completion signal) that gives notice that image processing is completed, to the failure diagnosis control section 20 every time the image processing of an arbitrary frame is finished.

The data selecting section 13 selects either one of image data that are outputted from the capture processing section 11 and the first image processing section 12, and outputs the image data to the second image processing section 14. The data selection of the data selecting section 13 is determined in accordance with an instruction from the control register 19. This processing is explained more specifically below. If the input frame is the processing target frame of the first image processing section 12, according to directions by the control register 19, the data selecting section 13 selects the image data in which image processing is performed by the first image processing section 12 and that is outputted, and it inputs the image data into the second image processing section 14. If the input frame is the processing non-target frame of the first image processing section 12, according to directions by the control register 19, the data selecting section 13 selects the image data that is outputted from the capture processing section 11, and it inputs the image data into the second image processing section 14.

The second image processing section 14 includes a DSP (digital signal processing unit) or the like, and performs predetermined image processing to image data that is outputted from the data selecting section 13. The second image processing section 14 performs, for example, image cutout processing of cutting out only a predetermined region from image data of one frame, and scaling processing of changing a size of a predetermined region in the image data of one frame. Image data after image processing is outputted to the system memory 16 via the system bus 15. Further, the second image processing section 14 outputs a signal (image processing completion signal) that gives notice that image processing has been completed to the failure diagnosis control section 20 every time the image processing of an arbitrary frame is finished.

The system memory 16 is configured by a semiconductor memory such as a RAM (random access memory) and a ROM (read only memory). The system memory 16 stores various kinds of information that are outputted from the first image processing section 12, image data that is outputted from the second image processing section 14 and the like.

The image recognition processing section 17 performs an image recognition for driving support control, such as obstacle detection, by using the image data after image processing that are stored in the system memory 16. The image recognition processing section 17 operates in accordance with an instruction that is outputted from the system control section 18 via the system bus 15. For example, when a failure of the first image processing section 12 or the second image processing section 14 is detected, the image recognition processing section 17 receives an instruction from the system control section 18 so as not to perform image recognition by using the image data of the frame via the corresponding section. In this case, the image recognition processing section 17 performs processing in accordance with the instruction which is outputted from the system control section 18, such as intermitting the image recognition processing, or performing alternative processing set in advance.

The system control section 18 includes a CPU (central processing unit) or the like, and controls an operation of the entire image processing apparatus 1. For example, when an interrupt signal that gives notice of failure detection of the first image processing section 12 (or the second image processing section 14) is outputted from the interrupt control section 27, the system control section 18 controls the image recognition processing section 17 so as not to use image data of the frame for which image processing is performed in the first image processing section 12 (or the second image processing section 14) a failure of which is detected. Further, the system control section 18 controls the respective sections of the image processing apparatus 1 so as not to perform image processing in the first image processing section 12 (or the second image processing section 14) the failure of which is detected.

The failure diagnosis control section 20 controls execution of the failure diagnosis of the first image processing section 12 and the second image processing section 14. The failure diagnosis control section 20 includes a failure diagnosis processing start timing generating section 21, failure diagnosis start control sections 22 and 24, and a signal selecting section 23 configured to function as a failure diagnosis permission notification section.

The failure diagnosis processing start timing generating section 21 generates signals to be a trigger of start control of the failure diagnosis of the first image processing section 12 and the second image processing section 14, and outputs the signals to the failure diagnosis start control sections 22 and 24. More specifically, the failure diagnosis processing start timing generating section 21 outputs two kinds of signals of an initialization signal (image processing start signal), and a failure diagnosis start timing signal to each of the failure diagnosis start control sections 22 and 24.

The initialization signal is a signal that is used to initialize an operation of the failure diagnosis start control sections 22 and 24 with start of image processing of an arbitrary frame. When the failure diagnosis processing start timing generating section 21 receives a frame input start signal from the capture processing section 11, the failure diagnosis processing start timing generating section 21 outputs the initialization signal soon, and the initialization signal is inputted to the failure diagnosis start control sections 22 and 24. The initialization signal is also a signal that gives notice of a timing for start of image processing. In the following explanation, the initialization signal will be described as an image processing start signal.

The failure diagnosis start timing signals in the first image processing section 12 and the second image processing section 14 are signals for giving notice of timings for start of the failure diagnosis at which the failure diagnosis, which are performed after image processing of an arbitrary frame, can be completed before the start of image processing of the next frame. The failure diagnosis start timing signals are inputted to the failure diagnosis start control sections 22 and 24 after a predetermined time period that is set to the control register 19 in advance elapses after the frame input start signal is received from the capture processing section 11.

Further, the failure diagnosis processing start timing generating section 21 outputs a pseudo image processing end signal to the signal selecting section 23. The pseudo image processing end signal is inputted to the signal selecting section 23 at a timing earlier by a predetermined time than the timing at which the failure diagnosis start timing signal is outputted.

The signal selecting section 23, configured to function as a failure diagnosis permission notification section, selects a signal to be a trigger of permission of start of failure diagnosis of the first image processing section 12 among a plurality of inputted signals, and outputs the signal to the failure diagnosis start control section 22 as a failure diagnosis start permission signal. In other words, the failure diagnosis start permission signal is a signal that gives notice that image processing in the first image processing section 12 is in an idle state, and the failure diagnosis is executable. Note that the idle state refers to a useable state, that is, a state in which image processing is executable, but no image processing is performed. Signals that are inputted to the signal selecting section 23 are the pseudo image processing end signal which is outputted from the failure diagnosis processing start timing generating section 21, and the image processing completion signal which is outputted from the first image processing section 12. In the control register 19, for the frame which is designated as the image processing target of the first image processing section 12, the image processing completion signal is selected, and is outputted as the failure diagnosis start permission signal. In the control register 19, for the frame (frame for which image processing is not performed in the first image processing section 12) which is not designated as the image processing target of the first image processing section 12, the pseudo image processing end signal is selected, and is outputted as the failure diagnosis start permission signal.

The failure diagnosis start control section 22 determines whether it is possible or not to complete the failure diagnosis of the first image processing section 12 by the failure diagnosis processing section 25, and outputs a failure diagnosis execution signal as an instruction of start of the failure diagnosis when the failure diagnosis can be completed within a predetermined period of time. In other words, it is judged whether the failure diagnosis, which is performed regularly after the image processing of one frame which is outputted from the capture processing section 11, can be completed or not before the start of image processing of the next frame. When it is determined that the failure diagnosis cannot be completed within the period of time, the failure diagnosis start control section 22 does not output a failure diagnosis execution signal to the failure diagnosis processing section 25.

In detail, when the failure diagnosis start timing signal is inputted in a period until the failure diagnosis start permission signal is inputted after the image processing start signal is inputted, the failure diagnosis start control section 22 determines that completion of the failure diagnosis is impossible within the period of time, and does not perform output of the failure diagnosis execution signal. When the failure diagnosis start control section 22 determines that execution of the failure diagnosis can be completed, the failure diagnosis start control section 22 outputs the failure diagnosis execution signal soon when the failure diagnosis start timing signal is inputted.

The failure diagnosis start control section 24 determines whether it is possible or not to complete the failure diagnosis of the second image processing section 14 by the failure diagnosis processing section 26, and outputs an instruction of start of the failure diagnosis as the failure diagnosis execution signal when the failure diagnosis can be completed within a predetermined period of time. When the failure diagnosis start control section 24 determines that the failure diagnosis cannot be completed within the period of time, the failure diagnosis start control section 24 does not output the failure diagnosis execution signal to the failure diagnosis processing section 26.

In detail, when the failure diagnosis start timing signal is inputted in a time period until the image processing completion signal is inputted after the image processing start signal is inputted, the failure diagnosis start control section 24 determines that the failure diagnosis cannot be completed within the period of time (insufficiency of execution time period), and does not output the failure diagnosis execution signal. When the failure diagnosis start control section 24 determines that the failure diagnosis can be completed, the failure diagnosis start control section 24 outputs the failure diagnosis execution signal soon when the failure diagnosis start timing signal is inputted.

The failure diagnosis processing section 25 performs the failure diagnosis of the first image processing section 12 by using a period of time in which the first image processing section 12 does not perform image processing. The failure diagnosis processing section 25 includes a DSP or the like, and performs the failure diagnosis with input of the failure diagnosis execution signal from the failure diagnosis start control section 22 as the trigger. More specifically, the failure diagnosis processing section 25 outputs scan test data which is set to inside in advance, to the first image processing section 12. When a scan test using the data is finished in the first image processing section 12, the scan test result is inputted to the failure diagnosis processing section 25 from the first image processing section 12. A normal value of the scan test result is known, and is set to inside in advance as an expectation value. The failure diagnosis processing section 25 compares the scan test result which is outputted from the first image processing section 12 with the expectation value which is set to inside in advance. When the scantest result and the expectation value coincide with each other, the failure diagnosis processing section 25 determines that the first image processing section 12 is normal. When the scan test result and the expectation value do not coincide with each other, the failure diagnosis processing section 25 determines that there is a failure in the first image processing section 12. The determination result of the failure diagnosis is outputted to the interrupt control section 27 as the failure diagnosis result information.

The failure diagnosis processing section 26 performs the failure diagnosis of the second image processing section 14 by using a period of time in which the second image processing section 14 does not perform image processing. The failure diagnosis processing section 26 includes a DSP or the like, and performs the failure diagnosis with input of the failure diagnosis execution signal from the failure diagnosis start control section 22 as the trigger. More specifically, the failure diagnosis processing section 26 outputs scan test data which is set to inside in advance, to the second image processing section 14. When a scan test using the data is finished in the second image processing section 14, the scan test result is inputted to the failure diagnosis processing section 26 from the second image processing section 14. A normal value of the scan test result is known, and is set to inside in advance as an expectation value. The failure diagnosis processing section 26 compares the scan test result which is outputted from the second image processing section 14 with the expectation value which is set to inside in advance. When the scan test result and the expectation value coincide with each other, the failure diagnosis processing section 26 determines that the second image processing section 14 is normal. When the scan test result and the expectation value do not coincide with each other, the failure diagnosis processing section 26 determines that there is a failure in the second image processing section 14. A determination result of the failure diagnosis is outputted to the interrupt control section 27 as a failure diagnosis result signal.

When either one of the failure diagnosis result signals which are outputted from the failure diagnosis processing sections 25 and 26 is a signal indicating failure determination, the interrupt control section 27 retains information on failure in an interrupt factor register not illustrated, and outputs an interrupt signal that gives notice of detection of the failure to the system control section 18. The information on failure that is retained in the interrupt factor register also includes information on the section in which a failure is detected (the first image processing section 12, and/or the second image processing section 14).

Figure 2:
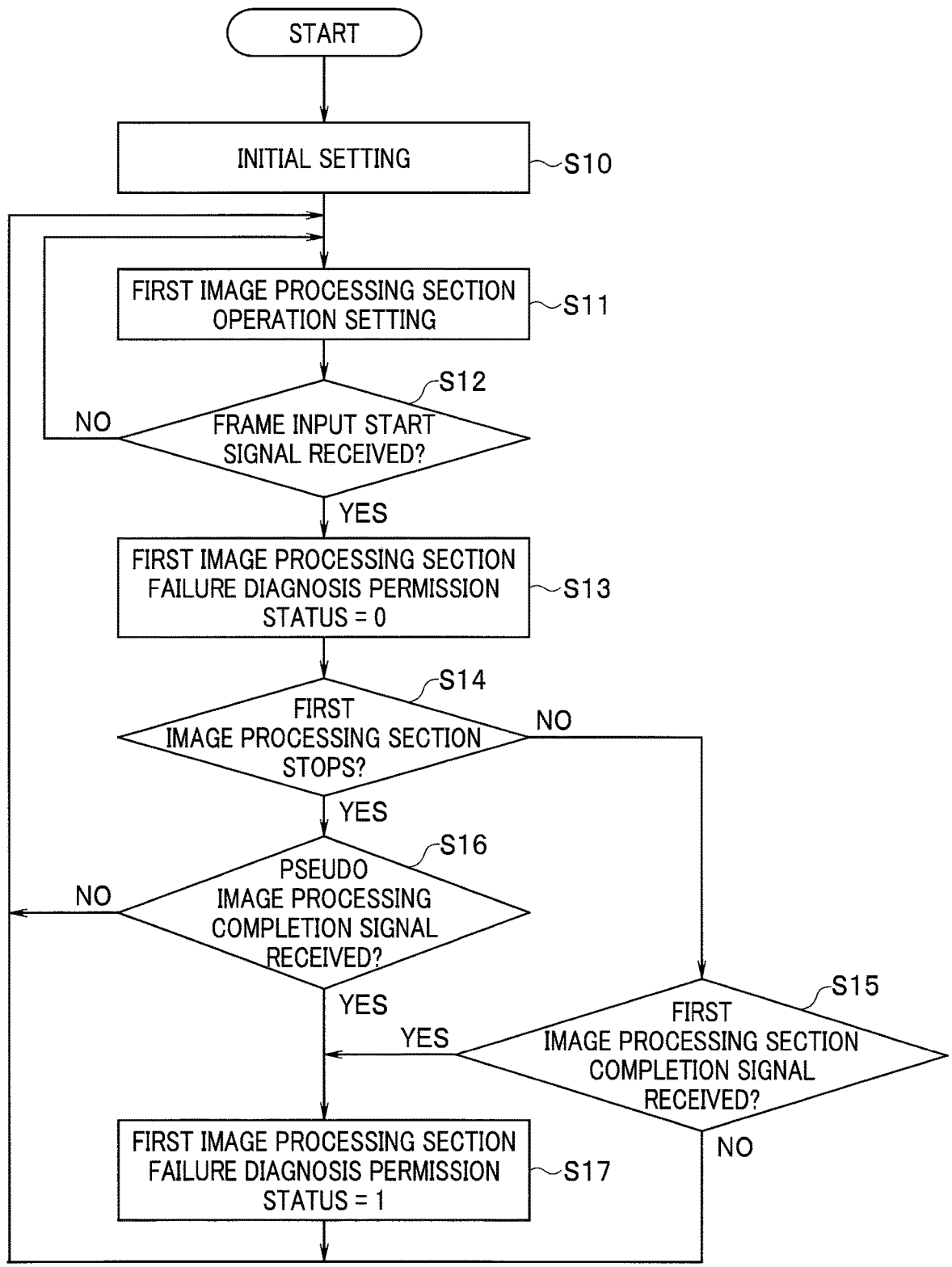
FIG. 2 is a flowchart explaining an example of a procedure of controlling a status of failure diagnosis permission of a first image processing section 12 according to the first embodiment.
Figure 3:
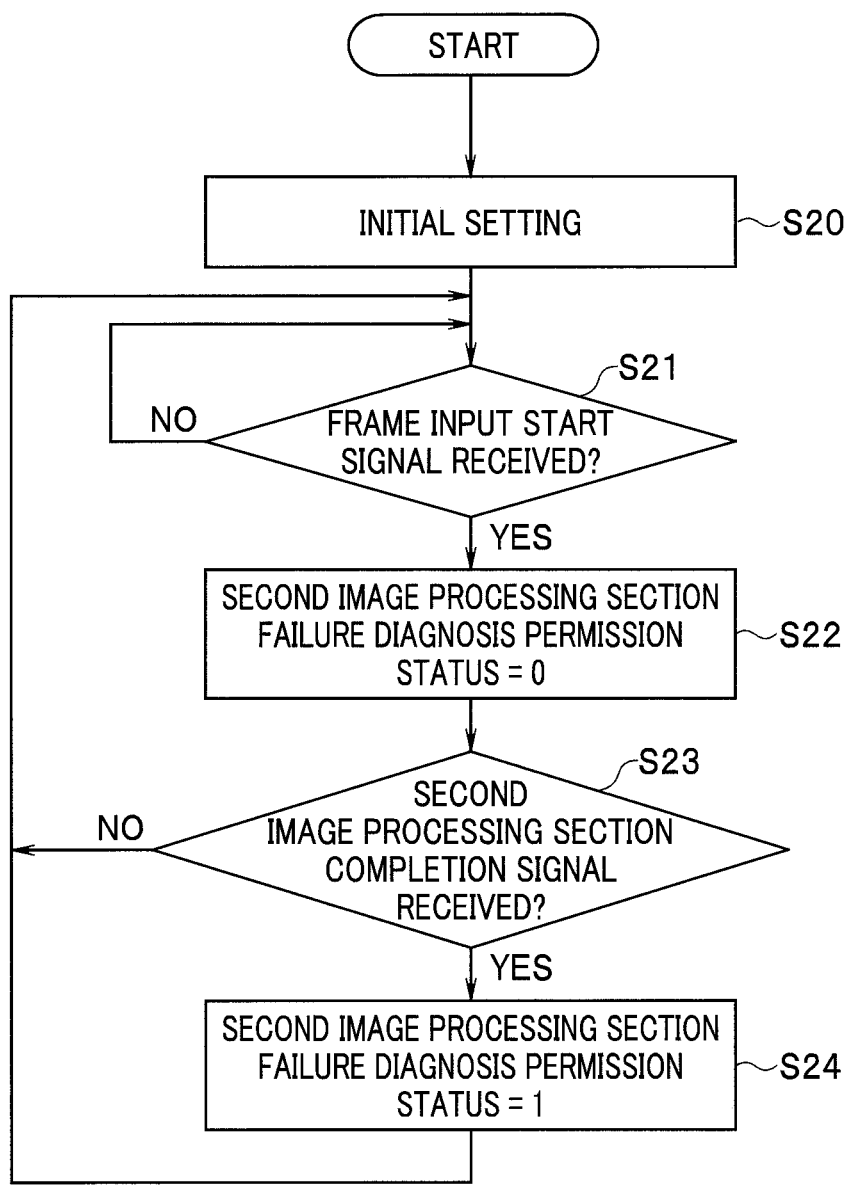
FIG. 3 is a flowchart explaining an example of a procedure of controlling a status of failure diagnosis permission of a second image processing section 14.
Figure 4:
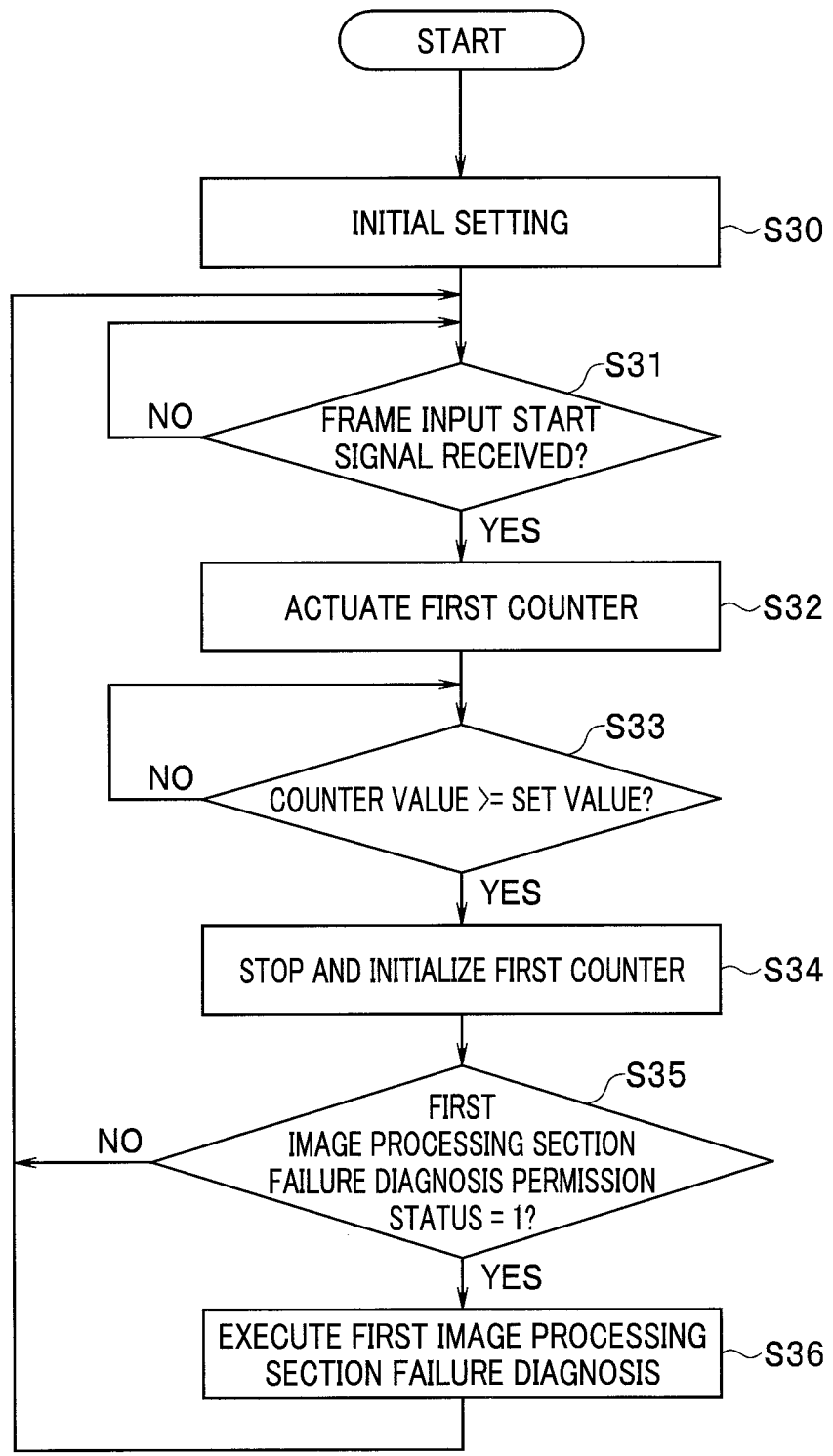
FIG. 4 is a flowchart explaining an example of a procedure of controlling execution of the failure diagnosis of the first image processing section 12.
Figure 5:
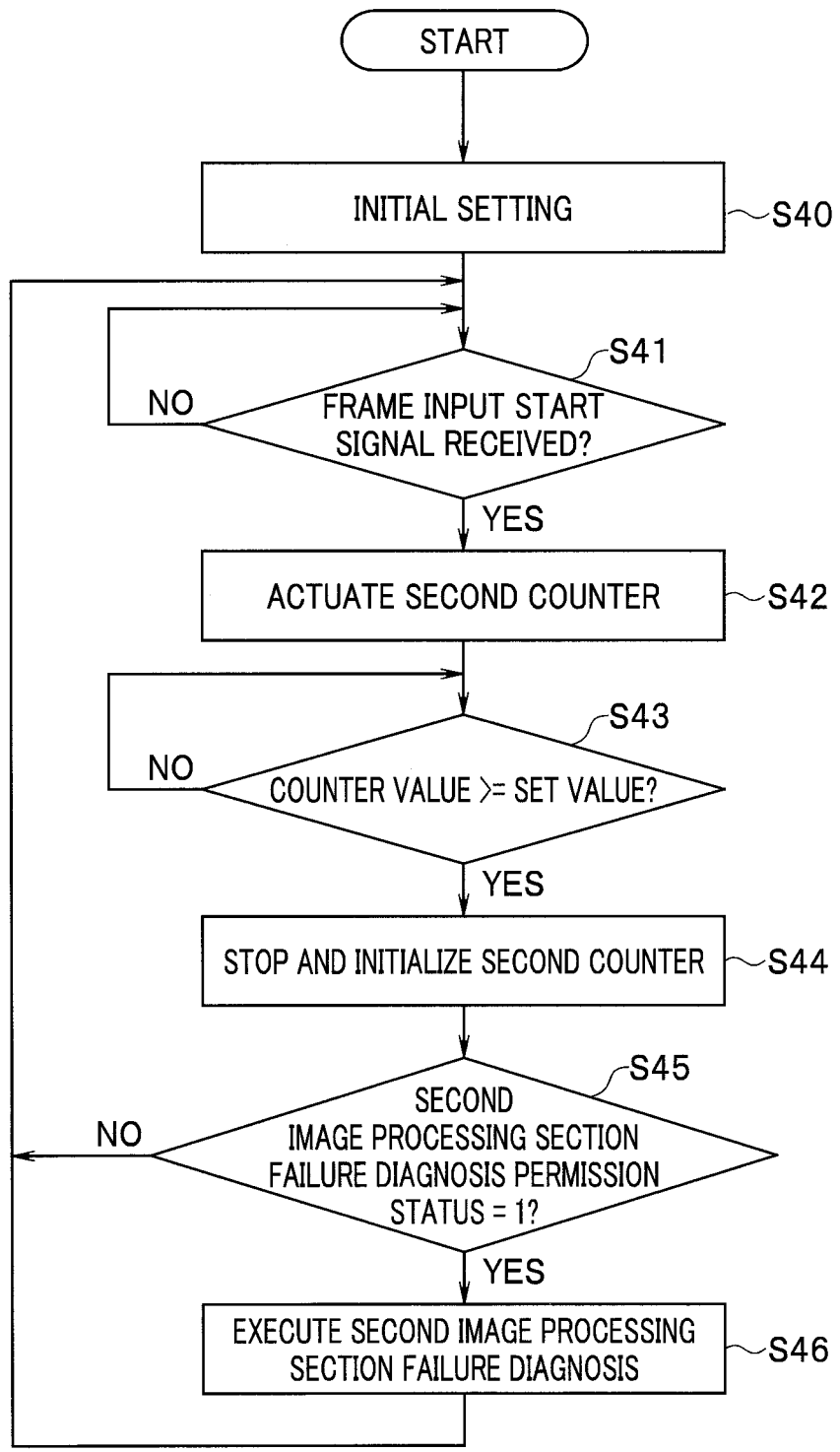
FIG. 5 is a flowchart explaining an example of a procedure of controlling execution of the failure diagnosis of the second image processing section 14.
Figure 6:
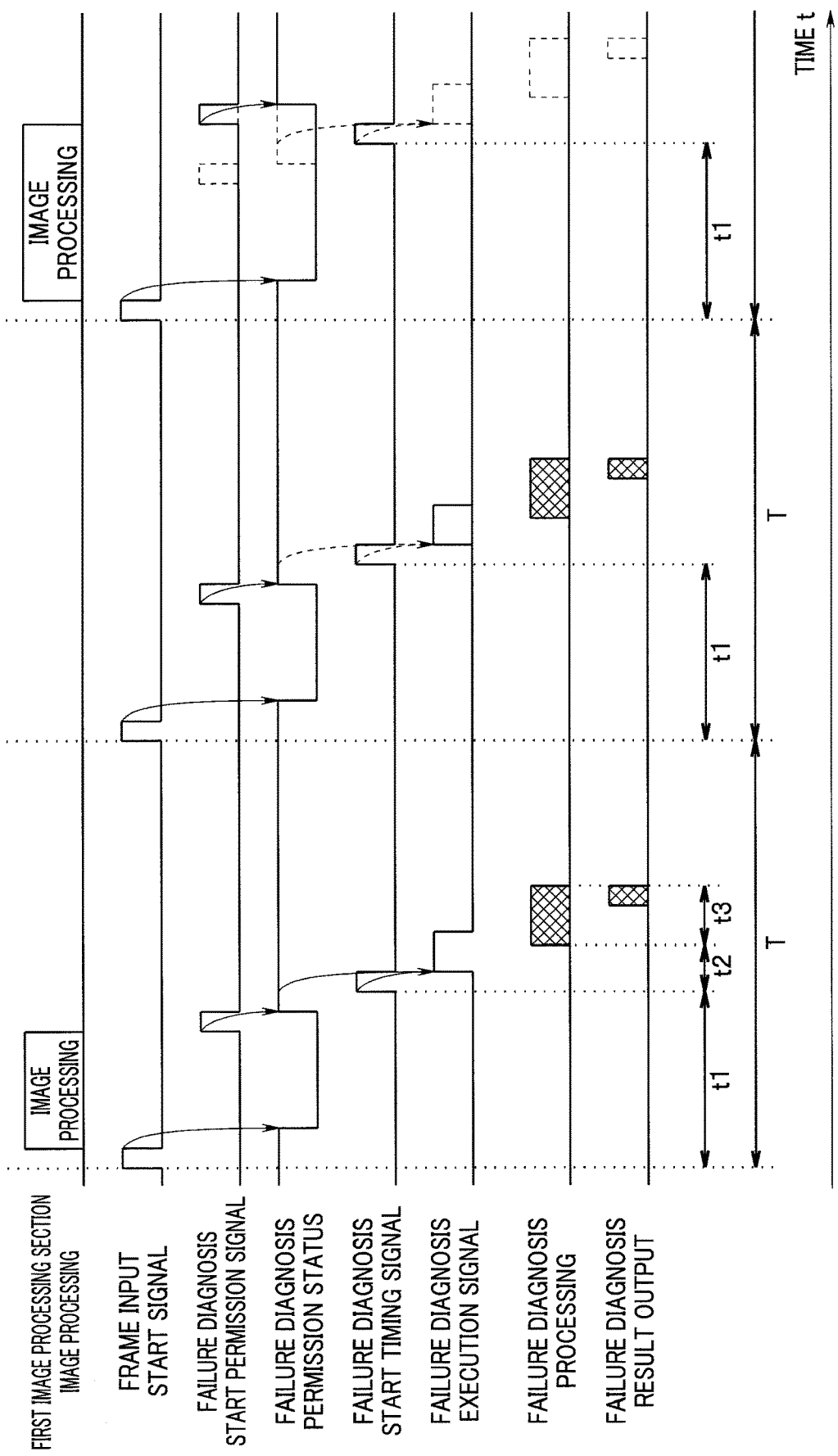
FIG. 6 is a timing chart concerning execution of the failure diagnosis of the first image processing section 12 according to the first embodiment.

Next, an operation of the failure diagnosis control section 20 will be described with reference to the respective drawings of FIG. 2 to FIG. 6. FIG. 2 is a flowchart explaining an example of a procedure of controlling a status of failure diagnosis permission of the first image processing section 12 according to the first embodiment. FIG. 3 is a flowchart explaining an example of a procedure of controlling a status of failure diagnosis permission of the second image processing section 14. FIG. 4 is a flowchart explaining an example of a procedure of controlling execution of failure diagnosis of the first image processing section 12. FIG. 5 is a flowchart explaining an example of a procedure of controlling execution of failure diagnosis of the second image processing section 14. FIG. 6 is a timing chart concerning execution of failure diagnosis of the first image processing section 12 according to the first embodiment.

First of all, with use of FIG. 2, FIG. 4, and FIG. 6, execution of failure diagnosis of the first image processing section 12 will be described. Note that the procedure of controlling the status of the failure diagnosis permission illustrated in FIG. 2, and the procedure of controlling execution of failure diagnosis illustrated in FIG. 4 are started in parallel.

First, the procedure of controlling the status of the failure diagnosis permission of the first image processing section 12 will be described. When initial setting of the image processing apparatus 1 is performed (S10), the failure diagnosis processing start timing generating section 21 acquires an operation setting of the first image processing section 12 to a next input frame from the control register 19 (S11). In other words, the failure diagnosis processing start timing generating section 21 acquires whether or not the next input frame is the image processing target frame of the first image processing section 12. Subsequently, the failure diagnosis processing start timing generating section 21 monitors input of a frame input start signal from the capture processing section 11 (S12). When the failure diagnosis processing start timing generating section 21 receives the frame input start signal (S12, YES), the failure diagnosis processing start timing generating section 21 outputs an image processing start signal to the failure diagnosis start control section 22.

The failure diagnosis start control section 22 sets "0" to the first image processing section failure diagnosis permission status (not illustrated) with reception of the image processing start signal as the trigger (S13). Note that the first image processing section failure diagnosis permission status is held inside of the failure diagnosis start control section 22.

If the input frame is the image processing target frame of the first image processing section 12, in other words, if the first image processing section 12 operates (S14, NO), the first image processing section 12 notifies the signal selecting section 23 of an image processing completion signal when the first image processing section 12 completes image processing of the frame. When the signal selecting section 23 receives the image processing completion signal (S15, YES), the signal selecting section 23 notifies the failure diagnosis start control section 22 of a failure diagnosis start permission signal. When the failure diagnosis start control section 22 receives the failure diagnosis start permission signal, the failure diagnosis start control section 22 sets a first image processing section failure diagnosis permission status (not illustrated) at "1" (S17).

If the input frame is not the image processing target frame of the first image processing section 12, in other words, if the image processing section 12 does not operate (S14, YES), the signal selecting section 23 monitors input of a pseudo image processing completion signal from the failure diagnosis start control section 22. When the signal selecting section 23 receives the pseudo image processing completion signal (S16, YES), the signal selecting section 23 notifies the failure diagnosis start control section 22 of the failure diagnosis start permission signal. When the failure diagnosis start control section 22 receives the failure diagnosis start permission signal, the failure diagnosis start control section 22 sets the first image processing section failure diagnosis permission status (not illustrated) at "1" (S17).

In this way, in the present embodiment, even if the input frame is not the image processing target frame of the first image processing section 12, the first image processing section failure diagnosis permission status can be set at "1" by the failure diagnosis start permission signal. Accordingly, regardless of whether or not the input frame is the image processing target frame of the first image processing section 12, the failure diagnosis start control section 22 can properly perform update of the first image processing failure diagnosis permission status.

Next, the procedure of controlling execution of failure diagnosis of the first image processing section 12, which is executed in parallel with the above described processing will be described. When the initial setting of the image processing apparatus 1 is performed (S30), the failure diagnosis processing start timing generating section 21 monitors input of the frame input start signal from the capture processing section 11 (S31). When receiving the frame input start signal (S31, YES), the failure diagnosis processing start timing generating section 21 actuates a first counter not illustrated (S32). Note that the first counter is configured inside of the failure diagnosis processing start timing generating section 21, for example.

The failure diagnosis processing start timing generating section 21 continues counting up until the first counter reaches a predetermined time (set value) that is set to the control register 19 in advance (S33, NO). When the first counter reaches the set value (S33, YES), the first counter is stopped, and initialized (S34). Note that the predetermined time is set to the control register 19 in advance so as to be a value obtained by subtracting a time period required for failure diagnosis from the frame period.

When the failure diagnosis processing start timing generating section 21 stops the first counter, the failure diagnosis processing start timing generating section 21 outputs a failure diagnosis start timing signal to the failure diagnosis start control section 22 soon. When the failure diagnosis start control section 22 receives the failure diagnosis start timing signal, the failure diagnosis start control section 22 confirms the first image processing section failure diagnosis permission status. When the first image processing section failure diagnosis permission status is "1" (S35, YES), the failure diagnosis start control section 22 transmits a failure diagnosis execution signal to the failure diagnosis processing section 25.

When the failure diagnosis processing section 25 receives the failure diagnosis execution signal, the failure diagnosis processing section 25 executes failure diagnosis of the first image processing section 12 soon (S36). More specifically, the failure diagnosis processing section 25 outputs scan test data to the first image processing section 12. In the first image processing section 12, a scan test is executed based on the inputted scan test data. A result of the scan test is outputted to the failure diagnosis processing section 25 from the first image processing section 12. The failure diagnosis processing section 25 compares the inputted scan test result with the expectation value. When the scan test result coincides with the expectation value, it is determined that the first image processing section 12 does not fail. When the scan test result does not coincide with the expectation value, it is determined that there is a failure in the first image processing section 12. A result of the determination is outputted to the interrupt control section 27 as a failure detection signal. After execution of the failure diagnosis, the failure diagnosis control section 20 is in a standby state until reception of the next frame input start signal, concerning execution control of failure diagnosis of the first image processing section 12.

When the first image processing section failure diagnosis permission status is "0" (S35, NO), the failure diagnosis start control section 22 does not transmit a failure diagnosis execution signal to the failure diagnosis processing section 25. In other words, the failure diagnosis of the first image processing section 12 is not executed, and the failure diagnosis control section 20 is in a standby state until reception of the next frame input start signal, concerning execution control of the failure diagnosis of the first image processing section 12.

A series of operations of the failure diagnosis control shown above will be described by using a timing chart in FIG. 6. The timing chart illustrated in FIG. 6 shows a flow of the failure diagnosis control concerning a frame period of time corresponding to three frame periods. Further, FIG. 6 illustrates a case where first and third inputted frames are image processing target frames of the first image processing section 12, and a second inputted frame is not the image processing target frame of the first image processing section 12, as an example.

First, a frame input start signal is outputted at a timing when the first frame is outputted to the first image processing section 12 from the capture processing section 11. When the failure diagnosis processing start timing generating section 21 receives the frame input start signal, an image processing start signal is outputted to the failure diagnosis start control section 22. When the failure diagnosis start control section 22 receives the image processing start signal, the failure diagnosis permission status is set at "0".

When image processing of the first frame is finished in the first image processing section 12, an image processing completion signal is outputted to the signal selecting section 23 from the first image processing section 12. When the signal selecting section 23 receives the image processing completion signal, a failure diagnosis start permission signal is outputted to the failure diagnosis start control section 22. When the failure diagnosis start control section 22 receives the failure diagnosis start permission signal, the failure diagnosis permission status is set at "1".

When a time period reaches a predetermined time period (t1) that is set in advance after the frame input start signal is received in the failure diagnosis processing start timing generating section 21, a failure diagnosis start timing signal is outputted to the failure diagnosis start control section 22. Note that the predetermined time period t1 is set to the control register 19 in advance so as to be a equal to or less than a value obtained by subtracting a time period (a time period obtained by adding up a response time period t2 until the failure diagnosis is started after a failure diagnosis execution instruction is made, and a time period t3 in which the failure diagnosis is executed in the first image processing section 12) required for the failure diagnosis from the frame period T.

At a time point at which the failure diagnosis start timing signal is inputted in the first frame period of time, the failure diagnosis permission status is "1", and therefore, a failure diagnosis execution signal is outputted to the failure diagnosis processing section 25 from the failure diagnosis start control section 22. When the failure diagnosis processing section 25 receives the failure diagnosis execution signal, the failure diagnosis is executed in the first image processing section 12, and a result is outputted. By a flow as above, the image processing, and the failure diagnosis after the image processing are executed in the first image processing section 12, in the first frame period of time.

When the frame period T elapses after the first frame is outputted from the capture processing section 11, a second frame is outputted from the capture processing section 11. The second frame is a frame which is not the processing target of the first image processing section 12, and therefore the frame is outputted to the data selecting section 13 from the capture processing section 11. At a timing when the second frame is outputted from the capture processing section 11, a frame input start signal is also outputted. When the failure diagnosis processing start timing generating section 21 receives the frame input start signal, an image processing start signal is outputted to the failure diagnosis start control section 22. When the failure diagnosis start control section 22 receives the image processing start signal, the failure diagnosis permission status is set at "0".

Since the second frame is the frame which is not the processing target of the first image processing section 12, image processing is not performed in the first image processing section 12. Accordingly, the signal selecting section 23 is not notified of an image processing completion signal. However, the failure diagnosis processing start timing generating section 21 outputs a pseudo image processing end signal to the signal selecting section 23 at a timing slightly earlier than the timing at which the predetermined time period t1 elapses after receiving the frame input start signal. When the signal selecting section 23 receives the pseudo image processing signal, the signal selecting section 23 outputs a failure diagnosis start permission signal to the failure diagnosis start control section 22. When the failure diagnosis start control section 22 receives the failure diagnosis start permission signal, the failure diagnosis permission status is set at "1".

In the failure diagnosis processing start timing generating section 21, a failure diagnosis start timing signal is outputted to the failure diagnosis start control section 22 at a timing when the predetermined time period t1 elapses after the frame input start signal is received. The failure diagnosis permission status is "1" at a time point at which the failure diagnosis start timing signal is inputted in the second frame period of time, and therefore a failure diagnosis execution signal is outputted to the failure diagnosis processing section 25 from the failure diagnosis start control section 22. When the failure diagnosis processing section 25 receives the failure diagnosis execution signal, the failure diagnosis of the first image processing section 12 is executed, and the failure diagnosis result is outputted from the first image processing section 12. By the flow as above, in the second frame period, the image processing and the failure diagnosis after the image processing are executed in the first image processing section 12.

When the frame period T elapses after the second frame is outputted from the capture processing section 11, the third frame is outputted from the capture processing section 11. Since the third frame is the processing target frame of the first image processing section 12, and therefore, a frame input start signal is outputted at a timing when the third frame is outputted to the first image processing section 12 from the capture processing section 11. When the failure diagnosis processing start timing generating section 21 receives the frame input start signal, an image processing start signal is outputted to the failure diagnosis start control section 22. When the failure diagnosis start control section 22 receives the image processing start signal, the failure diagnosis permission status is set at "0".

When image processing for the third frame is finished in the first image processing section 12, an image processing completion signal is outputted to the signal selecting section 23 from the first image processing section 12. Note that an image processing time period for the third frame is longer than the image processing time period of the first frame for the reason of congestion of data transfer of the system bus by other modules not illustrated or the like, and image processing ends after exceeding the predetermined time period t1. When the signal selecting section 23 receives the image processing completion signal, a failure diagnosis start permission signal is outputted to the failure diagnosis start control section 22. When the failure diagnosis start control section 22 receives the failure diagnosis start permission signal, the failure diagnosis permission status is set at "1".

In the failure diagnosis processing start timing generating section 21, a failure diagnosis start timing signal is outputted to the failure diagnosis start control section 22 at a timing when the predetermined time period t1 elapses after the frame input start signal is received. Since the failure diagnosis permission status is "0" at a time point at which the failure diagnosis start timing signal is inputted in the third frame time period, a failure diagnosis execution signal is not outputted. Accordingly, after the image processing for the third frame, the failure diagnosis of the first image processing section 12 is not performed. In other words, interruption of failure diagnosis due to insufficiency of time that can be used for failure diagnosis processing can be prevented. Further, since the failure diagnosis result during processing is not discarded, useless processing is not performed, and power consumption can be saved.

In this way, the image processing apparatus 1 of the present embodiment outputs the pseudo image processing end signal to the signal selecting section 23 at a timing slightly earlier than the timing at which the failure diagnosis start timing signal is outputted to the failure diagnosis start control section 22, with respect to the frame period of time in which image processing is not performed. When the signal selecting section 23 receives the pseudo image processing end signal, the signal selecting section 23 outputs a failure diagnosis start permission signal to the failure diagnosis start control section 22 soon. Accordingly, the failure diagnosis permission status is set at "1" at the timing when the failure diagnosis start control section 22 receives the failure diagnosis start timing signal, and therefore failure diagnosis of the first image processing section 12 can be reliably performed in a time period before the next frame is inputted. In other words, even if the frame for which image processing is performed in the first image processing section 12 and the frame for which image processing is not performed coexist, the failure diagnosis of the first image processing section 12 can be performed regularly.

Next, execution of failure diagnosis of the second image processing section 14 will be described with use of FIG. 3 and FIG. 5. Note that the procedure of controlling the status of failure diagnosis permission illustrated in FIG. 3, and the procedure of controlling execution of failure diagnosis illustrated in FIG. 5 are started in parallel. Further, these procedures are also performed in parallel with a control procedure concerning failure diagnosis of the first image processing section 12 illustrated in FIG. 2 and FIG. 4.

First, the procedure of controlling the status of the failure diagnosis permission of the second image processing section 14 will be described. When the initial setting of the image processing apparatus 1 is performed (S20), input of a frame input start signal from the capture processing section 11 is monitored (S21). When the failure diagnosis processing start timing generating section 21 receives the frame input start signal (S21, YES), the failure diagnosis processing start timing generating section 21 outputs an image processing start signal to the failure diagnosis start control section 22.

The failure diagnosis start control section 22 sets the second image processing section failure diagnosis permission status (not illustrated) at "0" with reception of the image processing start signal as the trigger (S22). Note that the second image processing section failure diagnosis permission status is held inside the failure diagnosis start control section 22, for example. When the second image processing section 14 completes image processing of the frame, the second image processing section 14 notifies the failure diagnosis start control section 24 of the failure diagnosis start permission signal. When the failure diagnosis start control section 24 receives the failure diagnosis start per-mission signal (S23, YES), the failure diagnosis start control section 24 sets the second image processing section failure diagnosis permission status (not illustrated) at "1" (S24).

Next, the procedure of controlling execution of failure diagnosis, which is executed in parallel with the above described processing will be described. The procedure of controlling execution of the failure diagnosis of the second image processing section 14 is similar to the procedure of the first image processing section 12 which is described by using FIG. 4, except that the counter which measures a timing is a second counter for the second image processing section 14. In other words, when the initial setting of the image processing apparatus 1 is performed (S40), the failure diagnosis processing start timing generating section 21 monitors input of the frame input start signal from the capture processing section 11 (S41). When the failure diagnosis processing start timing generating section 21 receives the frame input start signal (S41, YES), the failure diagnosis processing start timing generating section 21 actuates the second counter not illustrated (S42). Note that the second counter is configured inside of the failure diagnosis processing start timing generating section 21, for example.

The failure diagnosis processing start timing generating section 21 continues counting up in a time period until the second counter reaches a predetermined time (set value) which is set in the control register 19 in advance (S43, NO). When the second counter reaches the set value (S43, YES), the second counter is stopped and is initialized (S44). Note that the predetermined time is set to the control register 19 in advance so as to have a value obtained by subtracting the time period required for failure diagnosis from the frame period.

When the failure diagnosis processing start timing generating section 21 stops the second counter, the failure diagnosis processing start timing generating section 21 outputs a failure diagnosis start timing signal to the failure diagnosis start control section 22 soon. When the failure diagnosis start control section 22 receives the failure diagnosis start timing signal, the failure diagnosis start control section 22 confirms the second image processing section failure diagnosis permission status. When the second image processing section failure diagnosis permission status is "1" (S45, YES), the failure diagnosis start control section 22 transmits a failure diagnosis execution signal to the failure diagnosis processing section 26.

When the failure diagnosis processing section 26 receives the failure diagnosis execution signal, the failure diagnosis processing section 26 executes failure diagnosis of the second image processing section 14 soon (S46). More specifically, the failure diagnosis processing section 26 outputs scan test data to the second image processing section 14. In the second image processing section 14, a scan test is executed based on the inputted scan test data. The scan test result is outputted to the failure diagnosis processing section 26 from the second image processing section 14. The failure diagnosis processing section 26 compares the inputted scan test result with the expectation value. When the scan test result coincides with the expectation value, it is determined that the second image processing section 14 does not fail. When the scan test result does not coincide with the expectation value, it is determined that there is a failure in the second image processing section 14. The determination result is outputted to the interrupt control section 27 as a failure detection signal. After execution of the failure diagnosis, the failure diagnosis control section 20 is in a standby state until reception of the next frame input start signal, concerning execution control of failure diagnosis of the second image processing section 14.

When the second image processing section failure permission status is "0" (S45, NO), the failure diagnosis start control section 22 does not transmits a failure diagnosis execution signal to the failure diagnosis processing section 26. In other words, the failure diagnosis is not executed, and the failure diagnosis control section 20 is in a standby state until reception of the next frame input start signal, concerning execution control of failure diagnosis of the second image processing section 14.

In this way, when the failure diagnosis permission status is "0" at the time point at which the failure diagnosis start timing signal is inputted, the failure diagnosis execution signal is not outputted to the failure diagnosis processing section 26. In other words, when the image processing time period in the second image processing section 14 is long, and the time period which is necessary to execute failure diagnosis cannot be secured in the time period until image processing to the next frame is started, control is conducted so that the failure diagnosis is not performed. Accordingly, interruption of failure diagnosis due to insufficiency of the time that can be used for failure diagnosis processing can be prevented. Since the failure diagnosis result during processing is not discarded, useless processing is not performed, and power consumption can be saved.

As above, the image processing apparatus 1 of the present embodiment can regularly perform the failure diagnosis of the first image processing section 12 even if the frame for which image processing is performed in the first image processing section 12 and the frame for which image processing is not performed coexist. Further, when the image processing time periods or time period in the first image processing section 12 and/or the second image processing section 14 are/is long, interruption of failure diagnosis due to insufficiency of the time that can be used for failure diagnosis processing can be prevented.

Second Embodiment

Figure 7:
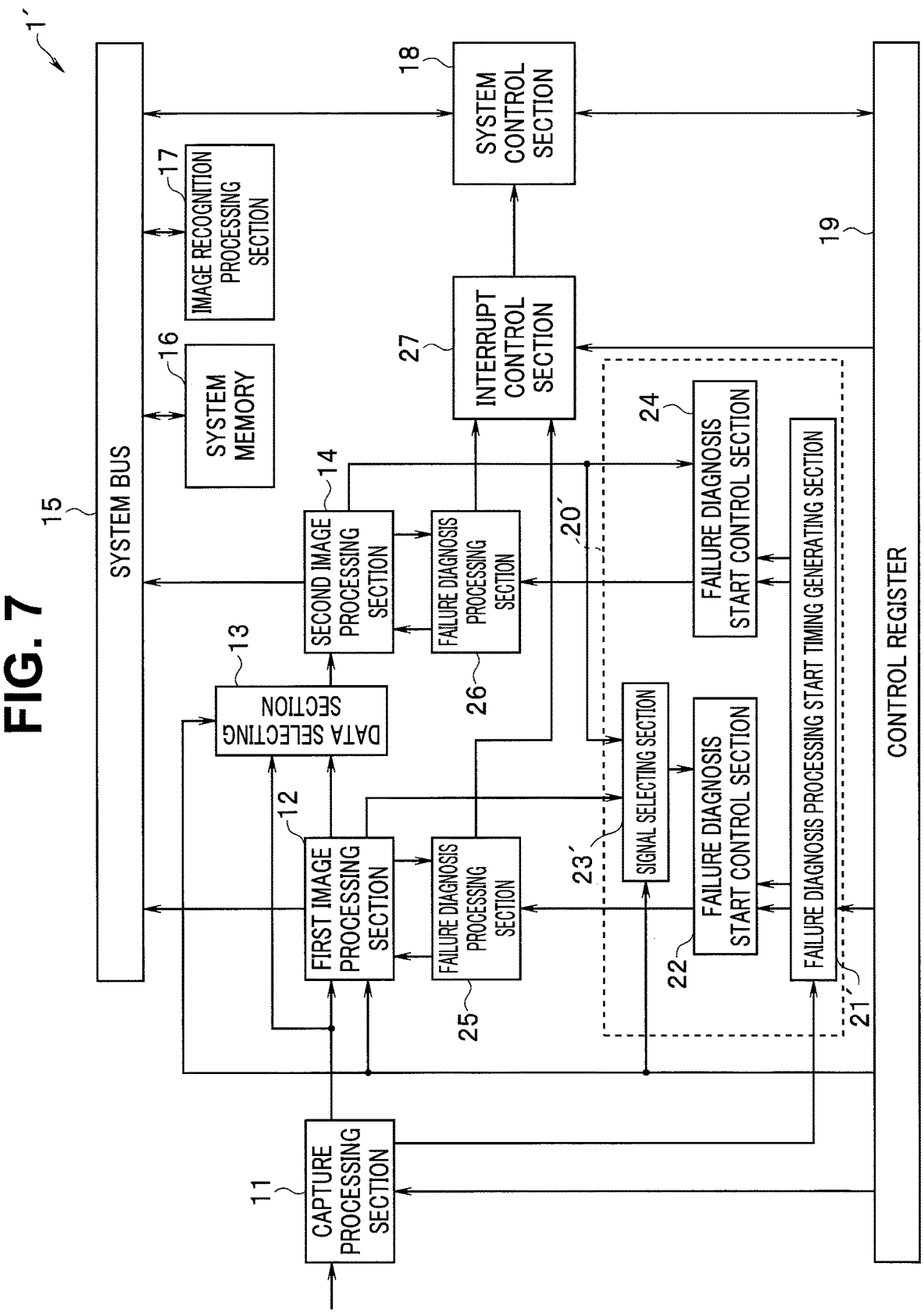
FIG. 7 is a block diagram illustrating an example of a configuration of an image processing apparatus 1' according to a second embodiment.

In the aforementioned first embodiment, to the frame for which image processing is not performed in the first image processing section 12, the signal selecting section 23 configured to function as the failure diagnosis permission notification section outputs a failure diagnosis start permission signal based on the pseudo image processing completion signal which is outputted from the failure diagnosis processing start timing generating section 21. In relation to this, the present embodiment differs from the first embodiment in that a signal selecting section 23' configured to function as a failure diagnosis permission notification section outputs a failure diagnosis start permission signal based on the image processing completion signal which is outputted from a second image processing section 14. FIG. 7 is a block diagram illustrating an example of a configuration of an image processing apparatus 1' according to the second embodiment. In FIG. 7, components similar to the components of the image processing apparatus 1 illustrated in FIG. 1 are assigned with same reference signs, and explanation will be omitted.

A failure diagnosis control section 20' of the image processing apparatus 1' illustrated in FIG. 7 controls execution of failure diagnosis of a first image processing section 12, and the second image processing section 14. The failure diagnosis control section 20' includes a failure diagnosis processing start timing generating section 21', failure diagnosis start control sections 22 and 24, and the signal selecting section 23' configured to function as the failure diagnosis permission notification section.

The failure diagnosis processing start timing generating section 21' generates signals to be a trigger of start control of the failure diagnosis of the first image processing section 12 and the second image processing section 14, and outputs the signals to the failure diagnosis start control sections 22 and 24. More specifically, the failure diagnosis processing start timing generating section 21' outputs two kinds of signals that are an image processing start signal, and a failure diagnosis start timing signal to each of the failure diagnosis start control sections 22 and 24.

The signal selecting section 23', configured to function as the failure diagnosis permission notification section, selects a signal to be a trigger of permission of start of failure diagnosis of the first image processing section 12 from a plurality of inputted signals, and outputs the signal to the failure diagnosis start control section 22 as a failure diagnosis start permission signal. In other words, the failure diagnosis start permission signal is a signal that gives notice that image processing in the first image processing section 12 is in an idle state, and failure diagnosis is executable. The signals which are inputted to the signal selecting section 23' are an image processing completion signal which is outputted from the first image processing section 12, and an image processing completion signal which is outputted from the second image processing section 14. In the control register 19, for a frame that is designated as an image processing target of the first image processing section 12, the image processing completion signal which is outputted from the first image processing section 12 is selected as the failure diagnosis start permission signal, and is outputted. In the control register 19, for a frame (a frame for which image processing is not performed in the first image processing section 12) that is not designated as the image processing target of the first image processing section 12, the image processing completion signal which is outputted from the second image processing section 14 is selected as the failure diagnosis start permission signal, and is outputted.

Next, an operation of the failure diagnosis control section 20' will be described. Respective procedures other than a procedure of controlling a failure diagnosis permission status of the first image processing section 12 and execution timings of the procedures, and a series of operations relating to execution control of failure diagnosis of the second image processing section 14 are similar to the procedures, execution timings and the series of the operations of the first embodiment, and therefore explanation will be omitted. Hereinafter, a procedure of controlling the status of failure diagnosis permission of the first image processing section 12 will be described with use of FIG. 8.

Figure 8:
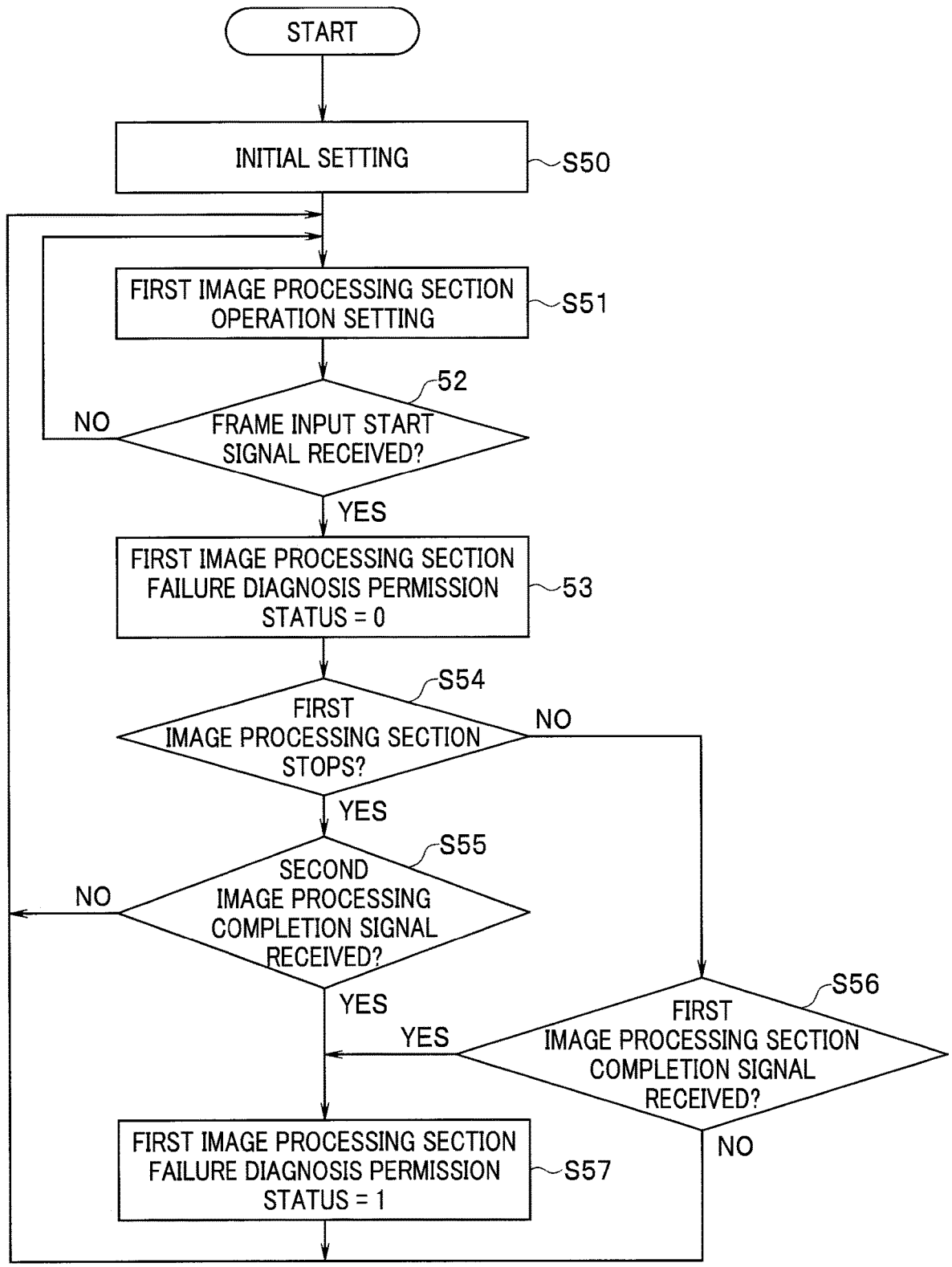
FIG. 8 is a flowchart explaining an example of a procedure of controlling a status of failure diagnosis permission of a first image processing section 12 according to the second embodiment.

FIG. 8 is a flowchart explaining an example of the procedure of controlling the status of failure diagnosis permission of the first image processing section 12 according to the second embodiment. When an initial setting of the image processing apparatus 1' is performed (S50), the failure diagnosis processing start timing generating section 21' acquires an operation setting of the first image processing section 12 to a next input frame from the control register 19 (S51). In other words, the failure diagnosis processing start timing generating section 21' acquires whether or not the next input frame is an image processing target frame of the first image processing section 12. Subsequently, the failure diagnosis processing start timing generating section 21' monitors input of the frame input start signal from a capture processing section 11 (S52). When the failure diagnosis processing start timing generating section 21' receives the frame input start signal (S52, YES), the failure diagnosis processing start timing generating section 21' outputs an image processing start signal to the failure diagnosis start control section 22.

The failure diagnosis start control section 22 sets a first image processing section failure diagnosis permission status (not illustrated) at "0" with reception of the image processing start signal as the trigger (S53). Note that the first image processing section failure diagnosis permission status is held inside of the failure diagnosis start control section 22, for example.

If the input frame is the image processing target frame of the first image processing section 12, in other words, if the first image processing section operates (S54, NO), the first image processing section 12 notifies the signal selecting section 23' of an image processing completion signal when the first image processing section 12 completes image processing of the frame. When the signal selecting section 23' receives the image processing completion signal (S55, YES), the signal selecting section 23' notifies the failure diagnosis start control section 22 of a failure diagnosis start permission signal. When the failure diagnosis start control section 22 receives the failure diagnosis start permission signal, the failure diagnosis start control section 22 sets the first image processing section failure diagnosis permission status (not illustrated) at "1" (S57).

If the input frame is not the image processing target frame of the first image processing section 12, in other words, if the first image processing section 12 does not operate (S54, YES), the signal selecting section 23' monitors input of the image processing completion signal from the second image processing section 14. As described above, the second image processing section 14 performs image processing to all the input frames, so that the second image processing section 14 also performs image processing to a frame that is not the processing target of the first image processing section 12, and outputs an image processing completion signal. When the second image processing section 14 completes image processing of the frame, the second image processing section 14 outputs an image processing completion signal to the signal selecting section 23' and the failure diagnosis start control section 24. When the signal selecting section 23' receives the image processing completion signal from the second image processing section 14 (S56, YES), the signal selecting section 23' notifies the failure diagnosis start control section 22 of a failure diagnosis start permission signal. When the failure diagnosis start control section 22 receives the failure diagnosis start permission signal, the failure diagnosis start control section 22 sets the first image processing section failure diagnosis permission status (not illustrated) at "1" (S57).

In this way, in the present embodiment, even if the input frame is not the image processing target frame of the first image processing section 12, the failure diagnosis start permission signal is outputted with the image processing completion signal of the frame in the second image processing section 14 as the trigger. The failure diagnosis start control section 22 can set the first image processing section failure diagnosis permission status at "1" by reception of the failure diagnosis start permission signal. Accordingly, regardless of whether or not the input frame is the image processing target frame of the first image processing section 12, the failure diagnosis start control section 22 can properly perform update of the first image processing failure diagnosis permission status.

In this way, even if the frame for which image processing is performed in the first image processing section 12 and the frame for which image processing is not performed coexist, the image processing apparatus 1' of the present embodiment can perform failure diagnosis of the first image processing section 12 regularly by using the image processing completion signal from the second image processing section 14.

Note that in the above described explanation, the case where the first image processing section 12, the second image processing section 14, the failure diagnosis processing sections 25 and 26, and the system control section 18 each includes a DSP and a CPU is described, but a hardware configuration does not intend to be limited to this. For example, all the processing may be performed by a plurality CPUs or one CPU.

Further, in the above described explanation, a case where the failure diagnosis processing sections 25 and 26 perform failure diagnosis by using the scan test pattern and the expectation value is described by being cited as an example, but the example does not intend to limit the method and content of the failure diagnosis. Other methods and contents may be used as long as the methods and contents cause the first image processing section 12 and the second image processing section 14 to execute some processing within a predetermined time period, and perform failure diagnosis based on the execution result.

While certain embodiments have been described, these embodiments have been presented by way of example only, and are not intended to limit the scope of the inventions. Indeed, the novel devices and systems described herein may be embodied in a variety of other forms; furthermore, various omissions, substitutions and changes in the form of the devices and systems described herein may be made without departing from the spirit of the inventions. The accompanying claims and their equivalents are intended to cover such forms or modifications as would fall within the scope and spirit of the inventions.

What is claimed is:

1. An image processing apparatus comprising:
   a first image processing section configured to perform image processing for each frame which is picturized continuously;
   a failure diagnosis processing section configured to perform failure diagnosis of the first image processing section at each frame period; and
   a failure diagnosis control section configured to control execution of the failure diagnosis to the failure diagnosis processing section,
   wherein the first image processing section performs image processing to the image data of a frame which is designated as a processing target frame, and
   the failure diagnosis control section includes a failure diagnosis permission notification section configured to give notice of a permission state that is a state where the first image processing section is capable of executing the failure diagnosis, and the failure diagnosis permission notification section gives notice of the permission state when the failure diagnosis permission notification section acquires notice that the first image processing section is in an idle state, if the input frame is a processing non-target frame.

2. The image processing apparatus according to claim 1, wherein the failure diagnosis control section further includes a failure diagnosis processing start timing generating section configured to generate a start timing signal of the failure diagnosis at a timing that the failure diagnosis is started and can be completed during a stopping period of the image processing of the first image processing section, and notices the start timing signal, and a failure diagnosis start control section configured to determine whether it is possible or not to complete the failure diagnosis based on notices of the permission state and the start timing signal, and outputs an instruction to the failure diagnosis control section, and the failure diagnosis processing start timing generating section notifies the failure diagnosis permission notification section that the first image processing section is in an idle state before generating the start timing signal, if the processing non-target frame is inputted.

3. The image processing apparatus according to claim 2, wherein the failure diagnosis start control section instructs execution of the failure diagnosis to the failure diagnosis control section, when the failure diagnosis start control section acquires the notice of the permission state before acquiring the notice of the start timing signal.

4. The image processing apparatus according to claim 1, further comprising a second image processing section configured to perform image processing of the image data for each frame,
   wherein if the input frame is the processing non-target frame, the failure diagnosis permission notification section acquires notice that the image processing of the first image processing section is in an idle state based on the completion of the image processing in the second image processing section.

5. The image processing apparatus according to claim 4, wherein the failure diagnosis control section further includes a failure diagnosis processing start timing generating section configured to generate a start timing signal of the failure diagnosis at a timing that the failure diagnosis is started and can be completed during a stopping time period of the image processing of the first image processing section, and notices the start timing signal, and a failure diagnosis start control section configured to determine whether it is possible or not to complete the failure diagnosis based on the notices of the permission state and the start timing signal, and output an instruction to the failure diagnosis control section.

6. The image processing apparatus according to claim 5, wherein the failure diagnosis start control section instructs execution of the failure diagnosis to the failure diagnosis control section when the failure diagnosis start control section acquires the notice of the permission state before acquiring the notice of the start timing signal.

7. A failure detection method is a detection method that relates to a first image processing section configured to perform image processing to image data of a processing target frame among frames that are picturized continuously, and detects a failure by performing failure diagnosis of the first image processing section for each input frame, comprising:
   setting a permission status of the failure diagnosis in the first image processing section to an execution impossible state by detection of the input frame;
   outputting a start timing signal of the failure diagnosis at a timing that the failure diagnosis is started after a predetermined time period elapses after detecting input of the processing target frame, and can be completed during a stopping period of the image processing of the first image processing section;
   outputting a pseudo image processing completion signal before the start timing signal is outputted;
   setting the permission status as an executable state when an image processing completion signal is received from the first image processing section, if the input frame is the processing target frame;

setting the permission status as an executable state when the pseudo image processing completion signal is received, if the input frame is a processing non-target frame;

outputting an execution signal of the failure diagnosis when the start timing signal is received, if the permission status is an executable state; and executing the failure diagnosis of the first image processing section by reception of the execution signal.

8. A failure detection method is a detection method that relates to a first image processing section configured to perform image processing to image data of a processing target frame among frames that are picturized continuously, and detects a failure by performing failure diagnosis of the first image processing section for each input frame, comprising:

setting a permission status of the failure diagnosis in the first image processing section as an execution impossible state by detection of the input frame;

outputting a start timing signal of the failure diagnosis at a timing that the failure diagnosis is started after a predetermined time period elapses after detecting input of the processing target frame, and can be completed during a stopping period of an image processing of the first image processing section;

setting the permission status as an executable state when an image processing completion signal is received from the first image processing section, if the input frame is a processing target frame;

setting the permission status as an executable state when the image processing of the input frame is completed in a second image processing section, if the input frame is a processing non-target frame;

outputting an execution signal of the failure diagnosis when the start timing signal is received, if the permission status is an executable state; and executing the failure diagnosis of the first image processing section by reception of the execution signal.

* * * * *